D. P. SHARP.
Horse Hay-Rake.
No. 216,110. Patented June 3, 1879.
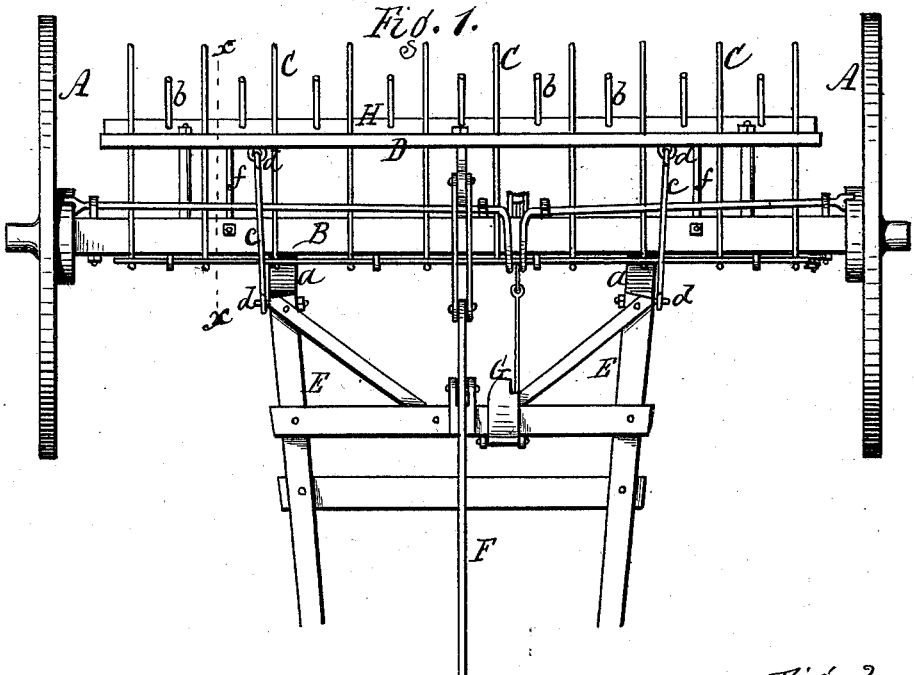
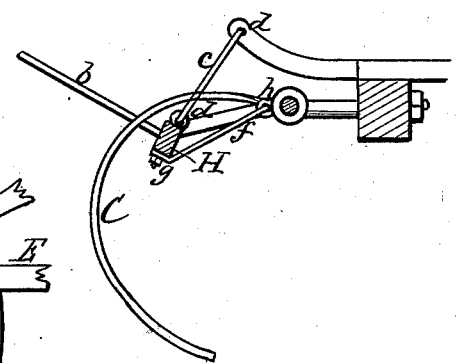
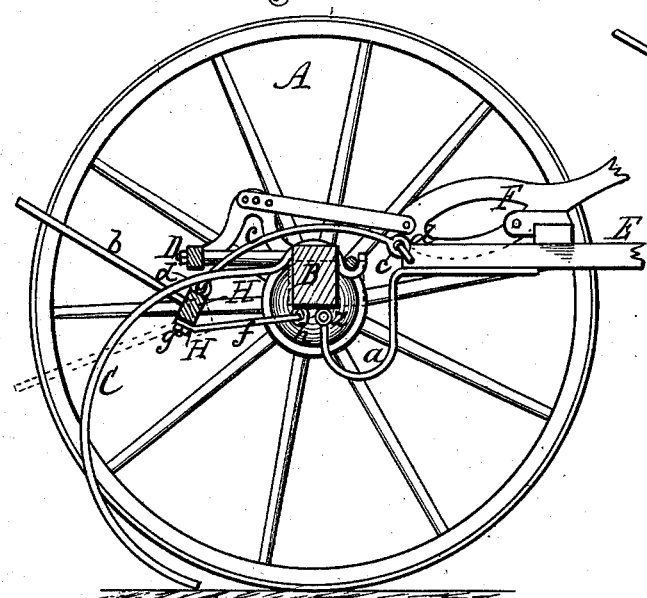
Attest.
Jacob Spahes
R. E. White
Inventor.
Dennis P. Sharp;
fr R. F. Osgood,
Atty.

UNITED STATES PATENT OFFICE.

DENNIS P. SHARP, OF ITHACA, NEW YORK, ASSIGNOR TO CHARLES M. SHARP, OF SAME PLACE.

IMPROVEMENT IN HORSE HAY-RAKES.

Specification forming part of Letters Patent No. 216,110, dated June 3, 1879; application filed October 12, 1877.

*To all whom it may concern:*

Be it known that I, DENNIS P. SHARP, of Ithaca, in the county of Tompkins and State of New York, have invented a certain new and useful Improvement in Horse-Rakes; and I do hereby declare that the following is a full, clear, and exact description of the construction and operation of the same, reference being had to the accompanying drawings, in which—

Figure 1 is a plan of the rake. Fig. 2 is a cross-section in line $x$ $x$ of Fig. 1. Fig. 3 is a modification.

My improvement relates to mounted horse-rakes; and the object is to so construct and arrange the clearer-bar and its teeth that at the upward movement of the rake-teeth to dump the load the clearer-teeth shall move downward in the reverse direction to strip the rake-teeth, the effect being to prevent the lodging of hay over the top of the clearer-teeth, also rendering the machine otherwise more effective.

The invention consists in the construction and arrangement of parts hereinafter more fully described.

A A represent the driving-wheels. B is the axle. C C are the rake-teeth. D is the holding-bar, resting over the top of the rake-teeth. E E are the thills. These parts may all be arranged in the well-known ways, and do not require special description.

Figs. 1 and 2 show that kind of rake in which the rake-teeth are attached directly to the axle, and the latter turns a partial revolution on its own axis. In such case the thills are connected with the axle by loops $a$ $a$, which bend down under the axle, and are jointed to the axle at the front of the under side, as shown at $z$ in Fig. 2.

The axle may be turned to dump the load either by a hand-lever, F, or a foot-treadle, G, having suitable connections with the axle.

H is the clearer-bar, located under the rake-teeth at a suitable position in the rear of the axle. This bar has the ordinary straight teeth $b$ $b$ projecting therefrom up from and through the rake-teeth, and nearly at right angles thereto.

The top of the clearer-bar is connected with the thills by stiff iron connections $c$ $c$, which are jointed at one end to the clearer, and at the other to the thills, as shown at $d$ $d$, said connections extending over the axle.

The bottom of the clearer-bar is connected with the bottom of the axle by similar connections, $f$ $f$, bolted fast at $g$ to the bar, but jointed at $h$ to the axle. This joint is placed some distance back from the vertical center of the axle and joint of the thills.

My invention consists, especially, of these connections $c$ $c$ and $f$ $f$.

The operation is as follows: When the axle is turned to raise the rake-teeth in dumping the load it makes nearly, or quite, a quarter-revolution, and the eye $h$, to which the connection $f$ is attached, is turned up and over, thereby drawing upon the connection $f$, and causing a corresponding drawing action upon the clearer-bar. But as this bar is stayed by the connections $c$, which are attached to the thills, (the latter being relatively stationary,) it cannot move inward, but is caused to turn axially, thereby forcing the clearer-teeth $b$ $b$ downward in the reverse direction to the movement of the rake-teeth, and stripping the hay from the latter. This effectually prevents any lodgment of hay over the clearer-teeth, which is a serious difficulty in ordinary rakes, where the clearer-teeth are stationary.

The same principle may be applied in those rakes where the rake-teeth are mounted on a shaft in the rear of the axle, separate from the axle, and in which the dumping action is produced by the turning of the shaft or the teeth on the shaft instead of the axle.

Such an arrangement is shown in Fig. 3, in which the connections $f$ are shown connected with the separate shaft behind the axle, and the connections $c$ are attached to curved projections extending behind the thills, but forming a rigid attachment to the thills.

Having thus described my invention, I claim—

The combination of the oscillating axle or rake-head B, the thill-frame E E, the clearer-bar H, with its teeth, the rigid connecting-rods $f$ $f$, extending forwardly from the clearer-bar and hinged to the axle or rake-head, and the hinged connecting-rods $c$ $c$, bridging the axle and hinged to the clearer-bar and thill-frame, substantially as described.

In witness whereof I have hereunto signed my name in the presence of two subscribing witnesses.

DENNIS P. SHARP.

Witnesses:
R. F. OSGOOD,
D. G. FICHTNER.